W. F. BROOKS.
Car-Axles.
No. 149,432. Patented April 7, 1874.
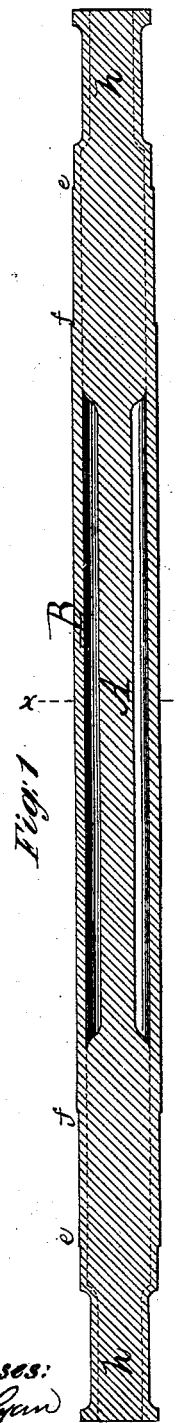
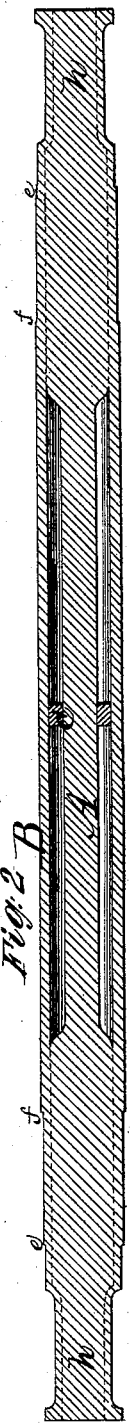
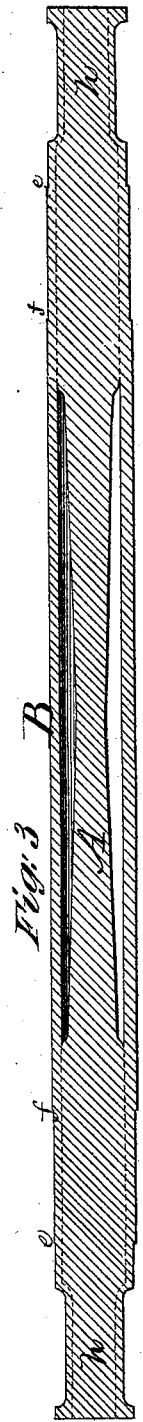
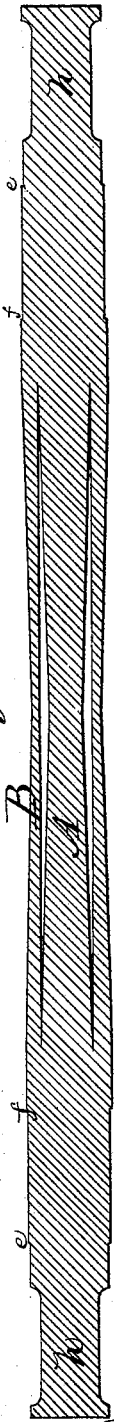

UNITED STATES PATENT OFFICE.

WILLIAM F. BROOKS, OF NEW YORK, N. Y.

IMPROVEMENT IN CAR-AXLES.

Specification forming part of Letters Patent No. 149,432, dated April 7, 1874; application filed February 18, 1874.

*To all whom it may concern:*

Be it known that I, WILLIAM FORMAN BROOKS, of New York, in the county and State of New York, have invented certain Improvements in Car-Axles, of which the following is a specification:

My invention relates to an improvement in car-axles, whereby I obtain greater strength and security, with less weight, than by the ordinary construction. The invention consists in an axle formed of a bar and a shell or hollow cylinder, the bar passing through the shell, and having its ends larger than the middle portion, and welded to the shell.

In the drawing, Figure 1 is a central longitudinal section of an axle constructed according to my invention. Fig. 2 is a similar view, showing a collar attached to the center of the bar. Fig. 3 shows the bar tapering from the ends toward the center. Fig. 4 shows both the bar and the shell tapering toward the center. Fig. 5 is a transverse section taken in the line $x\ x$ of Fig. 1.

The shell and bar may be made of different metals, such as a cast-steel shell and wrought-iron bar, or vice versa; or both shell and bar may be made of the same kind of metal.

The shell A is made of cylindrical form throughout. The bar B is of corresponding form, except in the middle portion for about one-half of its length, where it is smaller, as shown in Fig. 1, and may be tapering toward the center, as shown in Figs. 3 and 4, by which construction sufficient strength is acquired without unnecessary weight. The portions of the bar extending inward from each end for a distance equal to about one-fourth the length, more or less, are cylindrical, and correspond in size with the inside of the shell, so as to fit snugly when inserted therein. If desired, a collar, C, may be attached to the center of the bar, as shown in Fig. 2, for the purpose of strengthening it at that point. After the bar is inserted in the shell the two parts are welded together as far as the enlarged portions extend, so as to form a virtually solid axle for a few inches inside the wheel-seat, which lies between the points $e\ f$ at each end. The journals $h$ may be formed by swaging the metal of both the bar and the shell.

In order to diminish the weight, the bar may be made tapering toward the center, as shown in Fig. 3; or both bar and shell may be so formed, as shown in Fig. 4, by turning off the shell in a lathe.

In a truss-axle constructed according to my invention, I obtain greater strength and security, with less weight, than in a solid axle containing the same quantity of metal.

What I claim as new, and desire to secure by Letters Patent, is—

An axle formed of a bar and a hollow cylinder, the bar passing through the shell, and having its ends larger than the middle portion, and welded to the shell, substantially as shown and described.

WM. F. BROOKS.

Witnesses:
HENRY T. BROWN,
LEICESTER ALLEN.